B. MUHSOLD.
WATER LIFTING DEVICE.
APPLICATION FILED DEC. 5, 1913.
1,133,996.
Patented Mar. 30, 1915.
4 SHEETS—SHEET 3.
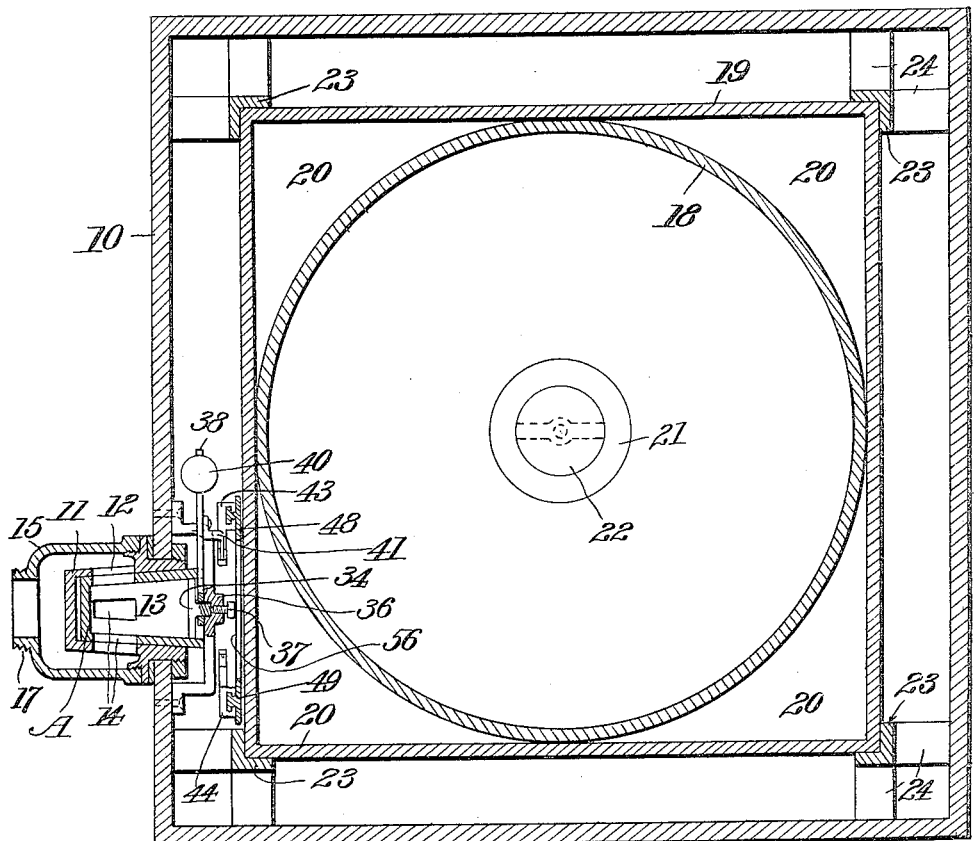
Fig. 3.
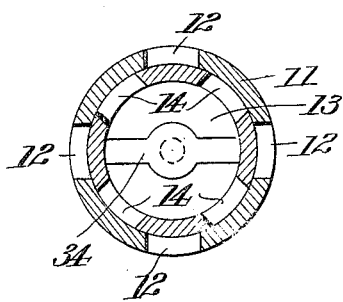
Fig. 5.
Witnesses
C. N. Walker.
A. J. Riedel.
Inventor,
Bernhard Muhsold.
By 
Attorney

B. MUHSOLD.
WATER LIFTING DEVICE.
APPLICATION FILED DEC. 5, 1913.

1,133,996.

Patented Mar. 30, 1915.
4 SHEETS—SHEET 4.

Inventor,
Bernhard Muhsold.

Witnesses
C. H. Walker.
A. J. Riedel

By
Attorney

UNITED STATES PATENT OFFICE.

BERNHARD MUHSOLD, OF WASHINGTON, DISTRICT OF COLUMBIA.

WATER-LIFTING DEVICE.

1,133,996. Specification of Letters Patent. Patented Mar. 30, 1915.

Application filed December 5, 1913. Serial No. 804,956.

*To all whom it may concern:*

Be it known that I, BERNHARD MUHSOLD, a citizen of the United States, residing at Washington, District of Columbia, have invented new and useful Improvements in Water-Lifting Devices, of which the following is a specification.

This invention relates to water lifting devices.

One object of the invention is to provide a water lifting device embodying among other characteristics means whereby the water of city or other mains may be lifted to elevations higher than the normal pressure is calculated to force it.

Another object of the invention is to provide a water lifting device particularly adapted for connection in pipe lines of dwellings or other high buildings so that water may be readily supplied to the uppermost floors when the normal pressure is not sufficient to force the water to the upper floors.

A still further object is to provide a water lifting device designed to lift water and it may be operated either by connection with city water mains or by location in streams, race-ways or other bodies of water.

With the above and other objects in view the present invention consists in the combination and arrangement of parts hereinafter more fully described, illustrated in the accompanying drawings and particularly pointed out in the appended claims, it being understood that changes may be made in the form, proportions, size and minor details without departing from the spirit or sacrificing any of the advantages of the invention.

Figure 1:
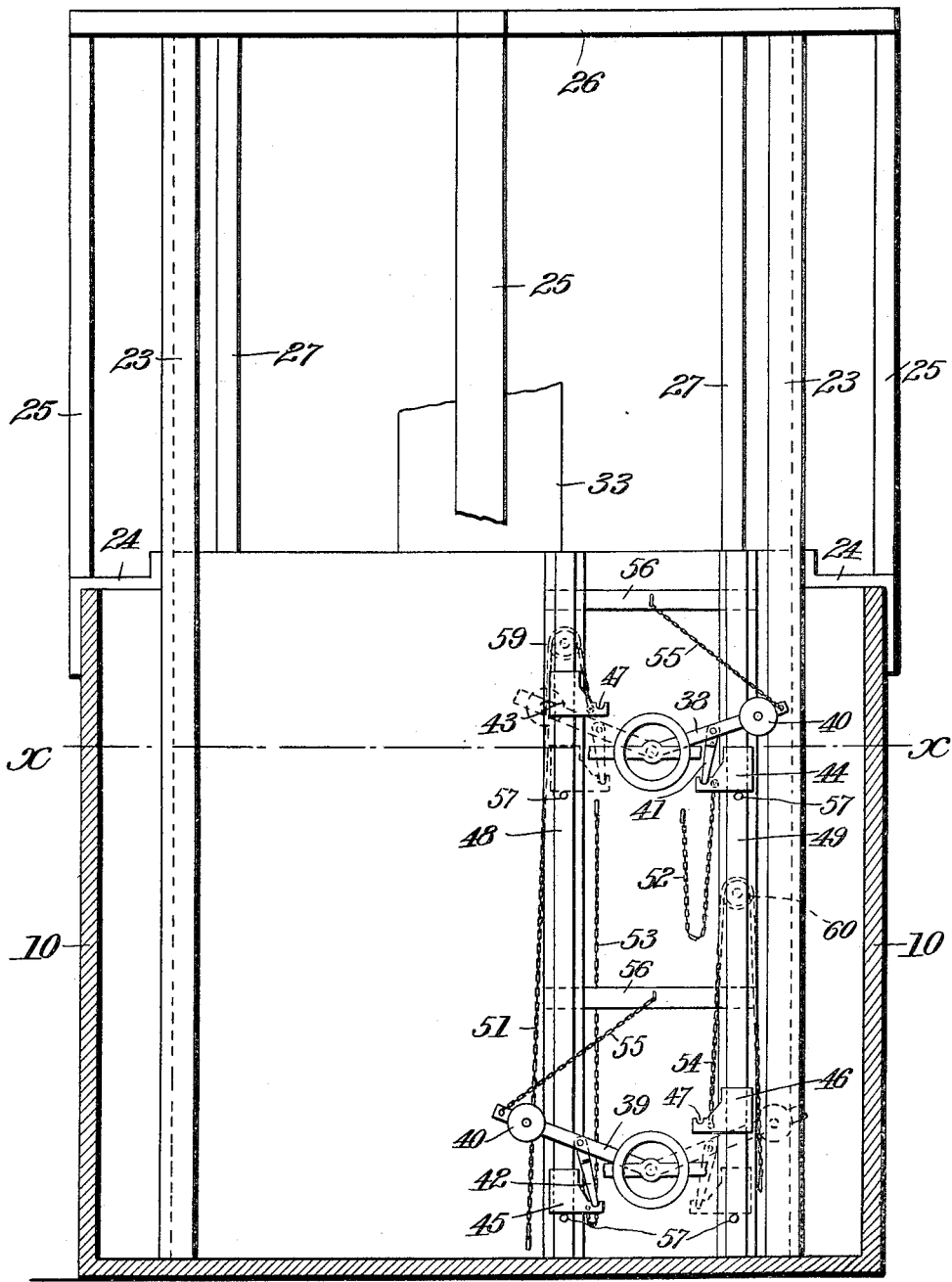
Figure 2:
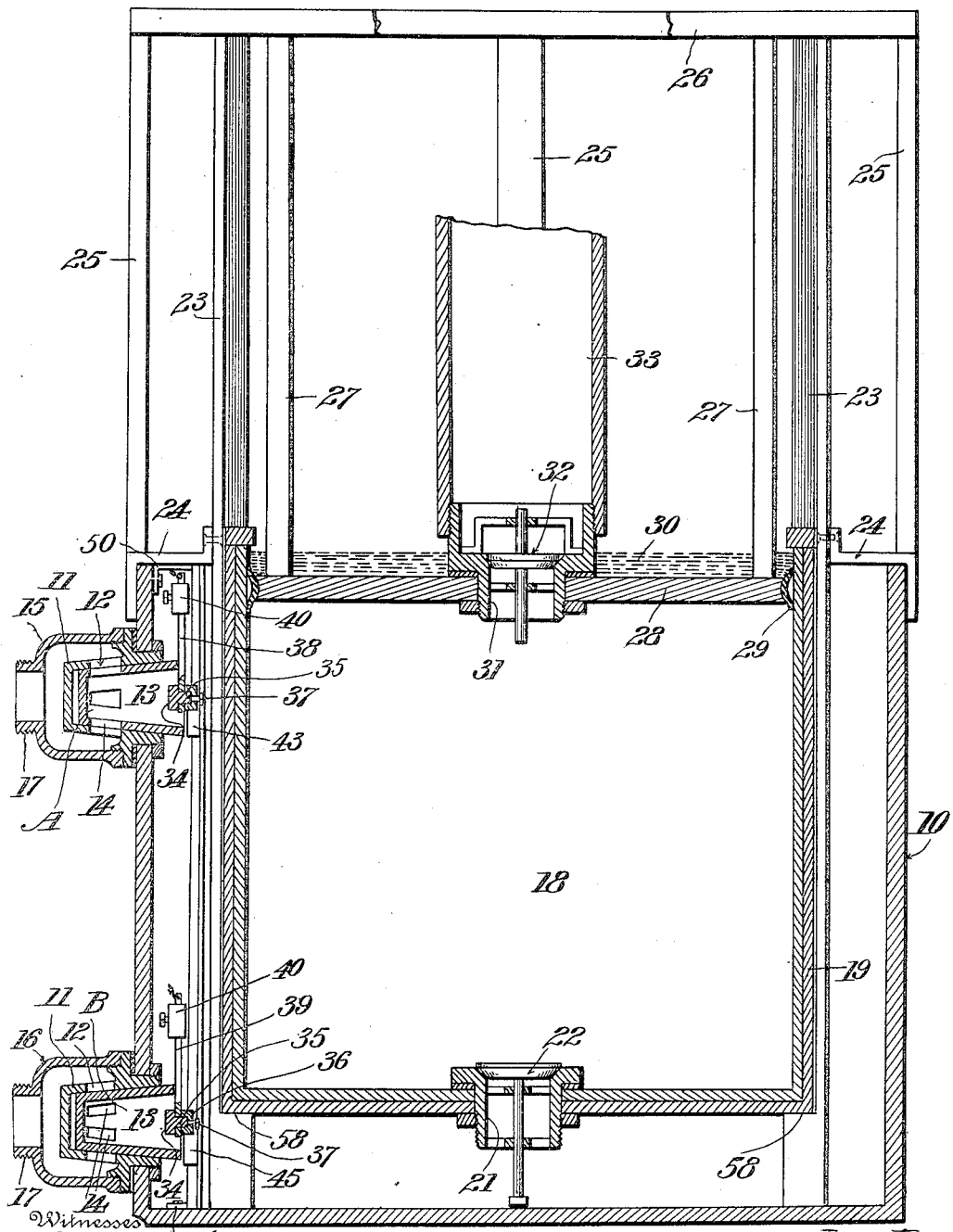
Figure 4:
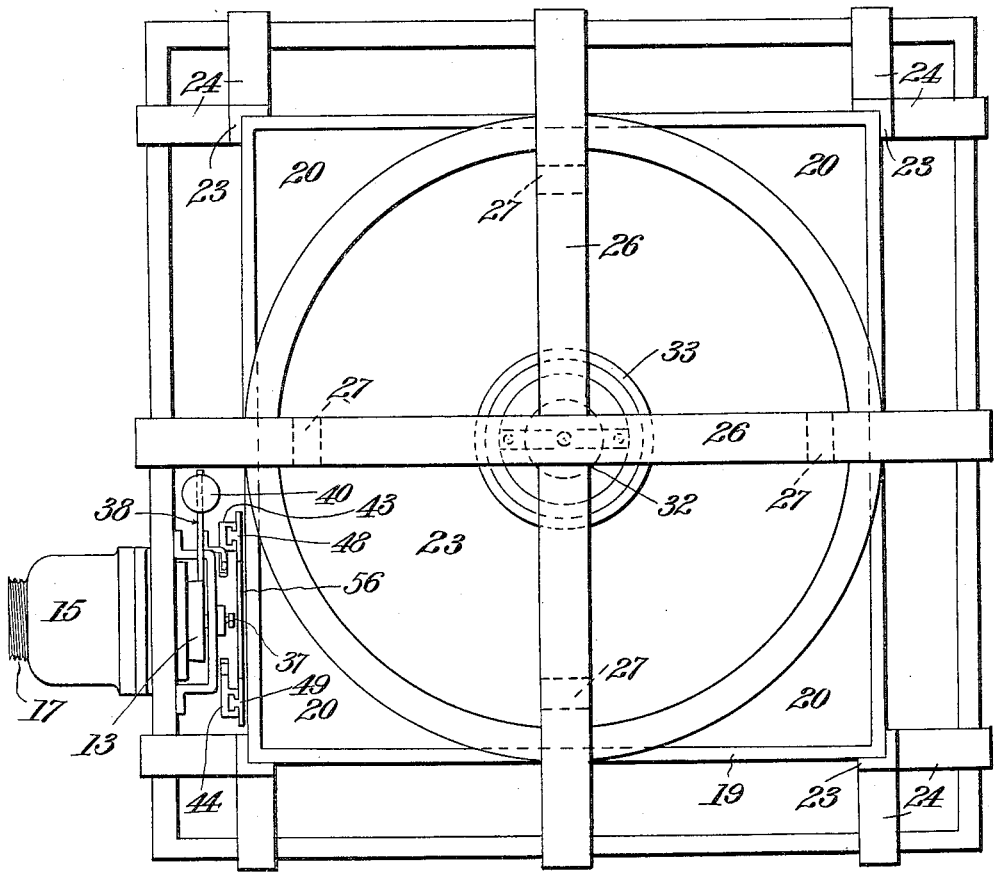
Figure 6:
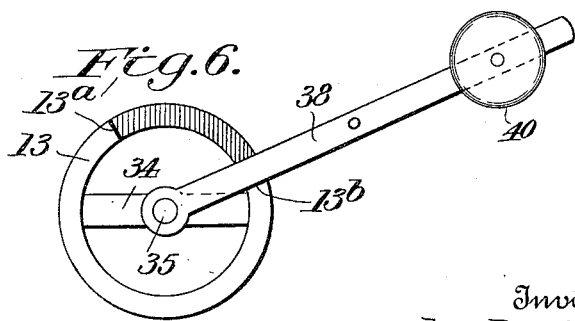

In the drawings:—Figure 1 is an elevation, partly in section, Fig. 2 is a vertical sectional view, Fig. 3 is a horizontal sectional view on the line $x$—$x$ of Fig. 1, Fig. 4 is a top plan view, Fig. 5 is a cross-sectional view of one of the tank valves, illustrating the parts thereof in closed relation. Fig. 6 is a detail view of the inner tubular member of one of the tank valves.

Referring now more particularly to the accompanying drawings, the reference character 10 indicates a tank of any suitable material and capacity. In its side wall it has openings in which are mounted inlet and outlet valves A and B, respectively. These valves may be of any suitable character, but, as shown, each valve consists preferably of an outer tubular member 11 fixed in the respective opening in the tank with a tubular member 13 fitted therein. Said outer members 11 are open at their inner ends and each has a plurality of port openings 12. Each tubular member 13 extends into the tank and has its inner end open and notched to form shoulders $13^a$ and $13^b$, and each has ports 14 adapted to be turned into and out of registration with the ports 12 of the outer tubular members so as to open and close the valves for a purpose presently explained. Casings 15 and 16 are fitted over the valves A and B, respectively, and each has a nipple 17, by virtue of which, the valve A may be connected to a water supply pipe (not shown) of a building while the valve B may be connected to a drain pipe (not shown), all for a purpose presently explained.

Slidably mounted in the tank 10 is a water chamber 18 which is preferably cylindrical and which is preferably fitted in a rectangular shaped jacket 19 and secured thereto so that both move vertically together. The jacket 19 not only shields the water chamber 18 but provides interspaces which form air chambers 20 between the chamber 18 and the jacket 19 to render the water chamber buoyant. Arranged centrally in the bottoms of the chamber 18 and jacket 19 is a hollow bushing 21 which forms a seat for the valve 22. There may be a plurality of these bushings 21 and valves 22, if desired.

The water chamber 18 and its jacket 19 are preferably open at their upper ends and are movable vertically in guides 23 under the influence of pressure of water in the tank 10 resting in lowermost position on the shoulders 58 adjacent the bottom of the tank 10, as will be explained. The guides 23 are preferably of the angle iron type to effectively slidably receive the angular corners of the jacket 19 and may be braced by the brackets 24, if desired.

Supported on the tank 10 in any suitable manner is a frame consisting of uprights 25 and cross-pieces 26. Depending from the cross-pieces 26 of the frame are arms 27 adapted to fixedly support a piston 28, which the water chamber 18 is adapted to slidably embrace, there being suitable packing material 29 carried by the piston to prevent the passage of air into the water chamber. As indicated at 30 water may be used to effectually seal the joint between the piston and chamber and thereby exclude air from the chamber.

Arranged preferably centrally of the piston 30 is an opening adapted to receive a hollow bushing 31 which has a valve seat for a valve 32. To the outer end of this bushing 31 may be connected a section 33 of the water pipe line of a building. A plurality of bushings 31 and valves 32 may be employed, if desired so as to connect the water chamber up with a plurality of outlet pipes or conduits for the purpose of directing water to different points. Thus my device is readily applicable for disposition in the water pipe line leading from a city main into a building for the purpose of lifting water to the upper floors of a tall building as will be explained.

The valves A and B are controlled by the movement of the water chamber and to this end suitable connections may be employed to operate the valves. If desired, the inner tubular members 13 of each of the valves A and B may have at its inner end a web 34 provided with a stud 35. These studs fit in brackets 36 in each of which latter a screw 37 may be mounted for engagement with the corresponding stud to take up undue looseness in the inner tubular member 13 of the respective valves. Levers 38 and 39 are journaled on said studs 35 and are movable in the notch at the inner end of the respective inner tubular part of the valves A and B for engagement first with one and then the other of said shoulders 13ª and 13ᵇ at the ends of the notches. On each lever 38 and 39 is adjustably mounted a weight 40. Each weighted lever 38 and 39 has a dog 41 and 42, respectively, pivoted thereto adapted to coöperate with upper and lower pairs of shoes, the upper set including two shoes 43 and 44 and the lower set including two shoes 45 and 46.

The shoes 43, 44, 45 and 46 each has a recess 47 and are freely slidable on guide strips 48 and 49 arranged between the jacket 19 and the tank 10 and preferably supported from the latter by connections 50 and 50'. Connected to the shoes 43 and 44 are chains 51 and 52, respectively, while connected to the shoes 45 and 46 are chains 53 and 54, respectively. Each of these chains has one end connected to the jacket 19 as shown and the chains 51 and 54 preferably work over pulleys 59 and 60 on the respective guide strips 48 and 49. The downward movement of the levers 38 may be limited by chains 55 connected at one of their ends to the connecting pieces 56 between the guide strips 48 and 49. The downward movement of the shoes may be limited by stops 57.

Assume that the water chamber 18 is full of water and resting in its lowermost position on the shoulders 58 adjacent the bottom of the tank 10. The valve A is now open to let in water into the tank. When the valve A is open the operating lever 38 occupies the full line position shown in Fig. 1 with its dog 41 engaging the shoe 44. At this time the valve B is closed with the operating lever 39 occupying full line position shown in Fig. 1, with its dog 42 engaging the shoe 45. The water gradually rises in the tank 10 and lifts the water chamber 18 forcing water of the chamber into the supply pipe or conduit 33. The chains 52 and 53 connected to the shoes 44 and 45 and to the jacket 19 of the chamber 18 gradually become taut just before the water chamber 18 reaches its uppermost position and pull the shoes 44 and 45 upwardly on the guide strips 48 and 49. This action causes the levers 38 and 39 to be drawn away from the shoes 44 and 45 to slightly past dead center of perpendicular position of the levers into engagement with the respective shoulders 13ª and 13ᵇ of the respective inner members of the valves A and B, when the weights 40 on the levers will cause the levers to rotate the inner valve members 13 and to assume the dotted line positions shown in Fig. 1, the shoes 43 and 46 lowering slightly incident to the slackening of the chains 51 and 54.

As the lever 38 is thereby shifted from the shoe 44 to the shoe 43 the valve A is closed and as the lever 39 is shifted simultaneously with the lever 38 from the shoe 45 to the shoe 46, the valve A is closed and the valve B opens with the result that the inlet valve A is closed and the water in the tank drains out through the valve B and the water chamber 18 falls with the lowering of the water in the tank. As the chamber 18 lowers, the pressure on the water in the tank 10 lifts the valve 22 and water is thereby taken into the chamber 18 to replenish the same with water or give to the chamber an amount of water substantially the same in quantity as that discharged into the pipe 33 on the upstroke of the chamber 18. When the water chamber reaches its lowermost position in the tank, the lever 39 is thrown by the shoe 46 to the full line position in Fig. 1 to close the outlet or drain valve B while the shoe 43 throws the lever 38 to the full line position in Fig. 1 to repeat the operation and thereby lift the water for purposes herein explained. It will thus be seen that the valves A and B open and close alternately under the influence of the movements of the water chamber and I wish it to be understood that I may eliminate the tank 10 and position the water chamber for operation under the influence of rising and falling tides.

My water lifting device is equally applicable for the purpose of lifting water for power purposes and for use in irrigating systems as it is for connection in the line of water supply pipes for buildings. Furthermore, the device may be readily substituted for the pumps now used for boiler injection and will effectually feed water under high pressure to boilers.

What I claim:

1. In a water lifting device, a tank open at its top and provided with an inlet valve and an outlet valve, a water chamber slidable vertically in the tank and provided at its lower end with a valved inlet, means to limit the downward movement of the water chamber to hold it spaced from the bottom of the tank, a fixed piston which is slidably embraced by the water chamber and which forms a closure for the chamber and which is provided with a valved outlet, means between the chamber and the inlet valve of the tank to permit ingress of water into the tank to lift said chamber and thereby discharge water from the chamber through the valve of the piston, means to close said inlet valve of the tank when the chamber reaches its uppermost position, and means for opening the outlet valve of the tank at the time of closing said inlet valve of the tank so that the chamber may move downwardly, the downward movement of the chamber against the pressure of the water in the tank opening the valve in the bottom of the chamber to replenish the latter with water.

2. In a water lifting device, a tank open at its top, an inlet valve, an outlet valve, a vertically movable water chamber in said tank, a piston which is slidably embraced by the water chamber and which has a valve forming an outlet for the water chamber, the water chamber having a valved inlet, means between the water chamber and said inlet and outlet valves of the tank to control the same by the movement of the water chamber and means to provide said chamber with an air chamber.

3. In a water lifting device, a tank provided with an inlet and an outlet valve, a water chamber in said tank provided with an inlet valve and which is movable under the influence of water in said tank, a piston in said chamber provided with a valved outlet, and means for operating said tank valves alternately said chamber having an external air chamber.

4. In a water lifting device, a tank provided with an inlet valve and an outlet valve, a water chamber in said tank movable under the influence of water in said tank and having an inlet valve, said chamber having a surrounding jacket forming an air chamber a piston in said chamber provided with a valved outlet, and connections between the tank and the tank valves to open and close them alternately.

5. In a water lifting device, a tank provided with a valved inlet and a valved outlet, a water chamber in said tank provided with an inlet valve in its bottom, said chamber having a jacket spaced therefrom to provide a surrounding air chamber, the chamber being movable vertically under the influence of the rise and fall of the water in the tank, a frame on the tank, a piston suspended in fixed position from the frame work and located in the water chamber and provided with a valve, and means for operating said tank valves alternately under the influence of movement of said chamber.

6. In a water lifting device, a tank provided with a valved inlet and a valved outlet, a water chamber in said tank provided with an inlet valve in its bottom, said chamber having a jacket providing an air chamber the chamber being movable vertically under the influence of the rise and fall of the water in the tank, a frame on the tank, a stationary piston supported by said frame work and located in the water chamber and provided with a valve, and connections between the water chamber and tank valves to operate the latter.

7. In a water lifting device, a vertically movable water chamber having a valved inlet, a casing surrounding said water chamber and providing an air chamber to give buoyancy to the latter, a fixed piston in the chamber and provided with a valved outlet, the inlet and outlet valves operating alternately.

8. In a water lifting device, a set of guide members, a water chamber which is circular in cross-section, a rectangular shaped jacket secured to the water chamber and providing air chambers between the water chamber and its jacket, said jacket being slidable in said guide members, the water chamber having a valved inlet, and a piston in the water chamber provided with a valved outlet.

9. In a water lifting device, a tank provided with a valved outlet and a valved inlet, guide members in the tank, a water chamber in the tank, a jacket surrounding the water chamber and fitted in said guide members to slide therein so that the water chamber and its jacket may move up and down in the tank under the influence of water in the tank, a piston in the water chamber provided with a valve, the water chamber having a valved inlet and means operable under the influence of the movements of the water chamber to operate the tank valves alternately.

10. In a water lifting device, a tank provided with a valved outlet and a valved inlet, guide members in the tank, a water chamber in the tank, a jacket surrounding the water chamber and fitted in said guide members to slide therein so that the water chamber and its jacket may move up and down in the tank under the influence of water in the tank, a piston in the water chamber provided with a valve, the water chamber having a valved inlet and means to operate under the influence of the movements of the water chamber to operate the tank valves alternately, the water chamber valves being operable under the influence of the pressure of water incident to the movements of the water chamber.

11. In a water lifting device, a tank provided with a valved outlet and with a valved inlet, a water chamber vertically movable in the tank and provided with a valved inlet, a fixed piston in the water chamber provided with a valve which affords an outlet for the water chamber, the water chamber valves being operable alternately, levers having connection with the tank valves, and flexible connections between said levers and the water chamber.

12. In a water lifting device, a tank provided with a valved inlet and with a valved outlet, guide members mounted in said tank, a water chamber in said tank, a jacket for the water chamber formed to provide an air chamber between it and the water chamber and to fit in said guide members for sliding movement therein under the influence of the rise and fall of water in said tank, the water chamber having a valved inlet, a piston mounted in said water chamber and provided with a valve to afford an outlet for the water chamber, guide bars in the tank between said jacket and the inner walls of the tank, shoes slidable on said guide bars, levers connected to the tank valves, each lever having a dog for engagement with said shoes, flexible connections between said shoes and the tank and flexible connections to limit movements of said levers.

In testimony whereof I affix my signature in presence of two witnesses.

BERNHARD MUHSOLD.

Witnesses:
 Gus. W. Brahler,
 Geo. C. Shoemaker.

Copies of this patent may be obtained for five cents each, by addressing the "Commissioner of Patents, Washington, D. C."